(12) United States Patent
Nishimura et al.

(10) Patent No.: US 6,626,563 B2
(45) Date of Patent: Sep. 30, 2003

(54) AUTOMATIC OPTICAL-AXIS ADJUSTING DEVICE FOR AUTOMATICALLY ADJUSTING OPTICAL AXES OF FRONT LIGHTS OF VEHICLE WITH REDUCED NUMBER OF SIGNALS

(75) Inventors: Kenichi Nishimura, Gifu (JP); Kunio Ohashi, Toyota (JP); Yoshiyuki Miki, Susono (JP); Yuji Yamada, Okazaki (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/968,607

(22) Filed: Oct. 2, 2001

(65) Prior Publication Data

US 2002/0039296 A1 Apr. 4, 2002

(30) Foreign Application Priority Data

Oct. 3, 2000 (JP) ...................................... 2000-303280

(51) Int. Cl.$^7$ ................................................ B60Q 1/00
(52) U.S. Cl. ........................ 362/465; 362/37; 362/466; 315/82
(58) Field of Search .............................. 362/37, 41, 43, 362/464, 465, 466, 40, 276, 802; 315/82, 79

(56) References Cited

U.S. PATENT DOCUMENTS

| 5,876,113 | A | * | 3/1999 | Gotoh | ........................ | 362/466 |
| 5,909,949 | A | * | 6/1999 | Gotoh | ........................ | 362/37 |
| 6,010,237 | A | * | 1/2000 | Gotou | ........................ | 362/466 |
| 6,459,387 | B1 | * | 10/2002 | Kobayashi et al. | ........... | 362/37 |

FOREIGN PATENT DOCUMENTS

| JP | A-6-309901 | 11/1994 |
| JP | B2-2950897 | 7/1999 |

* cited by examiner

*Primary Examiner*—Sandra O'Shea
*Assistant Examiner*—John Anthony Ward
(74) *Attorney, Agent, or Firm*—Posz & Bethards, PLC

(57) ABSTRACT

A steering wheel is determined to be under a counter steering state when the following two conditions are both satisfied: (I) a steering angle measured with a steering angle sensor is equal to or greater than a predetermined angle; and (II) a steering direction does not coincide with a turning direction of the vehicle. The vehicle is determined to be under a slipping state when the following two conditions are both satisfied: (I) the steering angle is equal to or greater than the predetermined angle; (II) an absolute value of a change per unit time of a difference between a left wheel speed and a right wheel speed is equal to or greater than a predetermined value. Under both the counter steering state and the slipping state, adjustment of the optical axes of the swivel lights is stopped or modified.

7 Claims, 5 Drawing Sheets

AUTOMATIC OPTICAL-AXIS ADJUSTING DEVICE FOR AUTOMATICALLY ADJUSTING OPTICAL AXES OF FRONT LIGHTS OF VEHICLE WITH REDUCED NUMBER OF SIGNALS

CROSS REFERENCE TO RELATED APPLICATION

This application is based on and incorporates herein by reference Japanese Patent Application No. 2000-30328 filed on Oct. 3, 2000.

BACKGROUND OF THE INVENTION

1. Field of the Invention

The present invention relates to an automatic optical-axis adjusting device for automatically adjusting optical axes and illuminating zones of front lights of a vehicle based on a steering angle of a steering wheel.

2. Description of Related Art

A vehicle stability control (VSC) has been proposed to stabilize a running state of a vehicle. In the VSC, a steering angle of a steering wheel, wheel speeds of left and right wheels, a lateral G (gravity) and/or a yaw rate are used as vehicle information to determine whether a turning direction of the vehicle coincides with a steering direction of a steering wheel. If the turning direction of the vehicle does not coincide with the steering direction of the steering wheel, the steering wheel is determined to be under a counter steering state where the steering direction of the steering wheel is opposite to the turning direction of the vehicle, and a countermeasure is taken to stabilize the running state of the vehicle.

Furthermore, in a previously proposed swivel control operation of vehicle front lights, optical axes of the vehicle front lights are turned in the same direction as the steering direction of the steering wheel. However, in such a swivel control operation of the vehicle front lights, the optical axes of the front lights may be turned in the direction that is different from the driver's desired sight direction under the counter steering state, so that the driver may experience an uncomfortable feeling. Thus, if a current state of the steering wheel is determined to be under the counter steering state, the swivel control of the front lights should be stopped, or alternatively the optical axes or the illuminating zones of the front lights should be returned to their initial states. This is also true when the vehicle is slipping, for example, on a wet curve road. In such a slipping state, the steering direction may not coincide with the turning direction of the vehicle.

If the various sensor signals utilized, for example, in the VSC are used to deal with the counter steering state of the steering wheel or to deal with the slipping state of the vehicle in the swivel control operation of the front lights, the number of the required signals becomes relatively large. This normally results in increase in costs, for example, for implementing the signal lines for these signals.

SUMMARY OF THE INVENTION

The present invention addresses the above disadvantage, and it is an objective of the present invention to provide an automatic optical-axis adjusting device for automatically adjusting optical axes of vehicle front lights capable of eliminating or reducing the above disadvantage.

To achieve the objective of the present invention, there is provided an automatic optical-axis adjusting device for automatically adjusting an optical axis of at least one front light of a vehicle. The automatic optical-axis adjusting device includes a steering angle measuring means for measuring a steering angle of a steering wheel of the vehicle, a wheel speed measuring means for measuring left and right wheel speeds of left and right wheels of the vehicle, respectively, a swivel control means for adjusting the optical axis of the at least one front light by turning the optical axis of the at least one front light in a right or left direction based on the steering angle measured with the steering angle measuring means, a counter steering state determining means for determining whether the steering wheel is under a counter steering state, and a swivel modifying means for stopping or modifying adjustment of the optical axis of the at least one front light through the swivel control means when the counter steering state determining means determines that the steering wheel is under the counter steering state. The steering wheel is determined to be under the counter steering state when the following two conditions are both satisfied: (I) the steering angle measured with the steering angle measuring means is equal to or greater than a predetermined angle; and (II) a steering direction of the steering wheel determined based on the steering angle does not coincide with a turning direction of the vehicle estimated based on a difference between the left wheel speed and the right wheel speed measured with the wheel speed measuring means.

Also, to achieve the objective of the present invention, there is also provided an automatic optical-axis adjusting device for automatically adjusting an optical axis of at least one front light of a vehicle. The automatic optical-axis adjusting device includes a steering angle measuring means for measuring a steering angle of a steering wheel of the vehicle, a wheel speed measuring means for measuring left and right wheel speeds of left and right wheels of the vehicle, respectively, a swivel control means for adjusting the optical axis of the at least one front light by turning the optical axis of the at least one front light in a right or left direction based on the steering angle measured with the steering angle measuring means, a slipping state determining means for determining whether the vehicle is under a slipping state, and a swivel modifying means for stopping or modifying adjustment of the optical axis of the at least one front light through the swivel control means when the slipping state determining means determines that the vehicle is under the slipping state. The vehicle is determined to be under the slipping state when the following two conditions are both satisfied: (I) the steering angle measured with the steering angle measuring means is equal to or greater than a predetermined angle; and (II) an absolute value of a change per unit time of a difference between the left wheel speed and the right wheel speed measured with the wheel speed measuring means is equal to or greater than a predetermined value.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described.

(First Embodiment)

Figure 1:
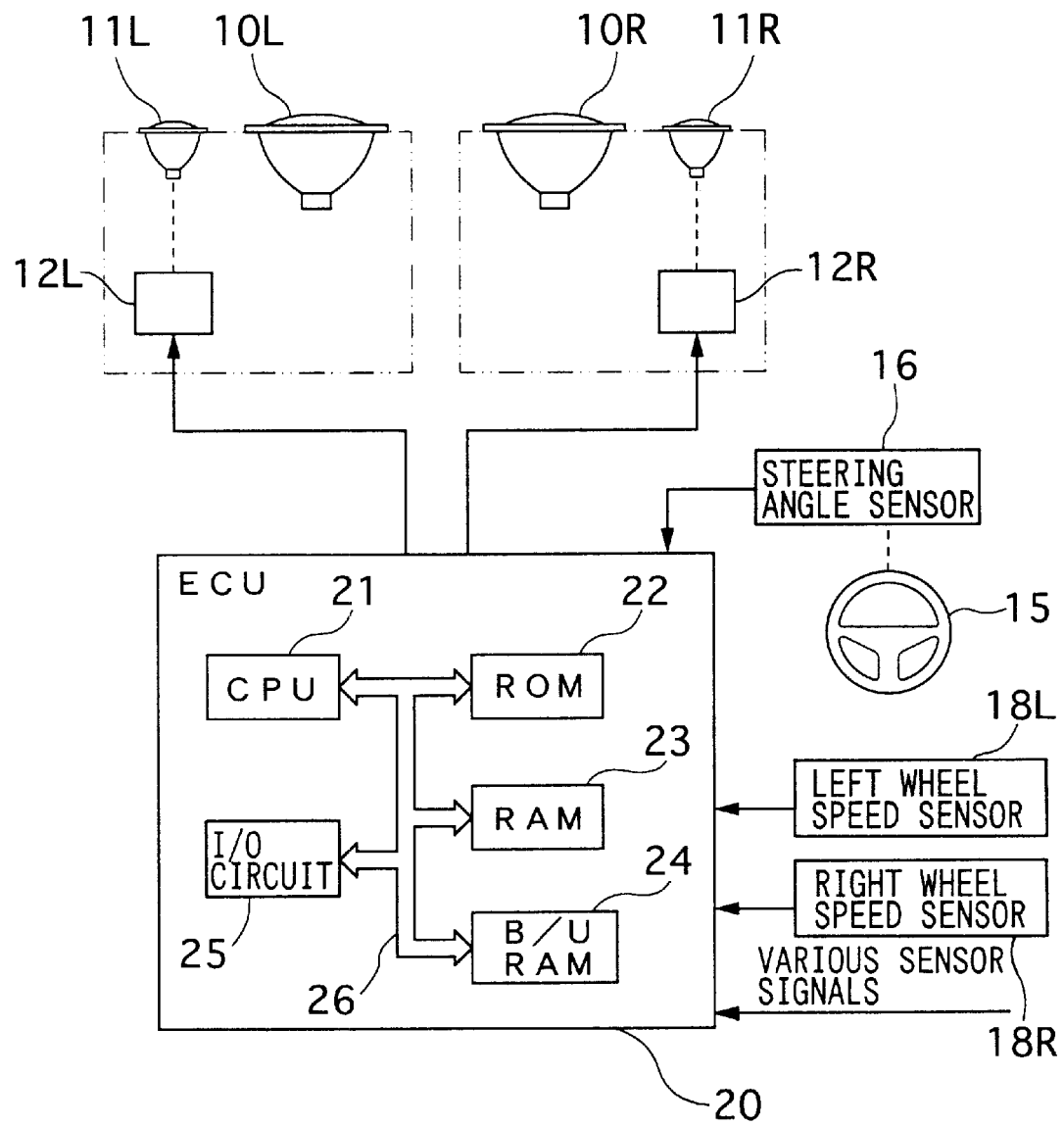
FIG. 1 is a schematic view showing an entire structure of an automatic optical-axis adjusting device for automatically adjusting optical axes of front lights of a vehicle according to first and second embodiments of the present invention.

FIG. 1 is a schematic view showing an entire structure of an automatic optical-axis adjusting device for automatically adjusting optical axes of front lights of a vehicle according to a first embodiment of the present invention.

With reference to FIG. 1, left and right headlights 10L, 10R as well as left and right swivel lights 11L, 11R are arranged at a front of the vehicle as vehicle front lights. A reference numeral 20 denotes an electronic control unit (ECU). The ECU 20 is formed as a logical operation circuit that includes a CPU 21, a ROM 22, a RAM 23, a backup (B/U) RAM 24, an input-output (I/O) circuit 25 and a bus line 26. The CPU 21 is a central processing unit that carries out various known arithmetic operations. The ROM 22 stores control programs. The RAM 23 stores various data. The bus line 26 interconnects the components of the ECU 20.

An output signal from a steering angle sensor 16 that measures a steering angle θs of a steering wheel 15, an output signal from a left wheel speed sensor 18L that measures a left wheel speed VL of a left vehicle wheel, an output signal from a right wheel speed sensor 18R that measures a right wheel speed VR of a right vehicle wheel, and various other sensor signals are inputted to the ECU 20. Output signals from the ECU 20 are inputted to actuators 12L, 12R of the left and right swivel lights 11L, 11R, respectively. Optical axes of the left and right swivel lights 11L, 11R are adjusted based on the output signals from the ECU 20, as will be described in greater detail below.

Figure 2:
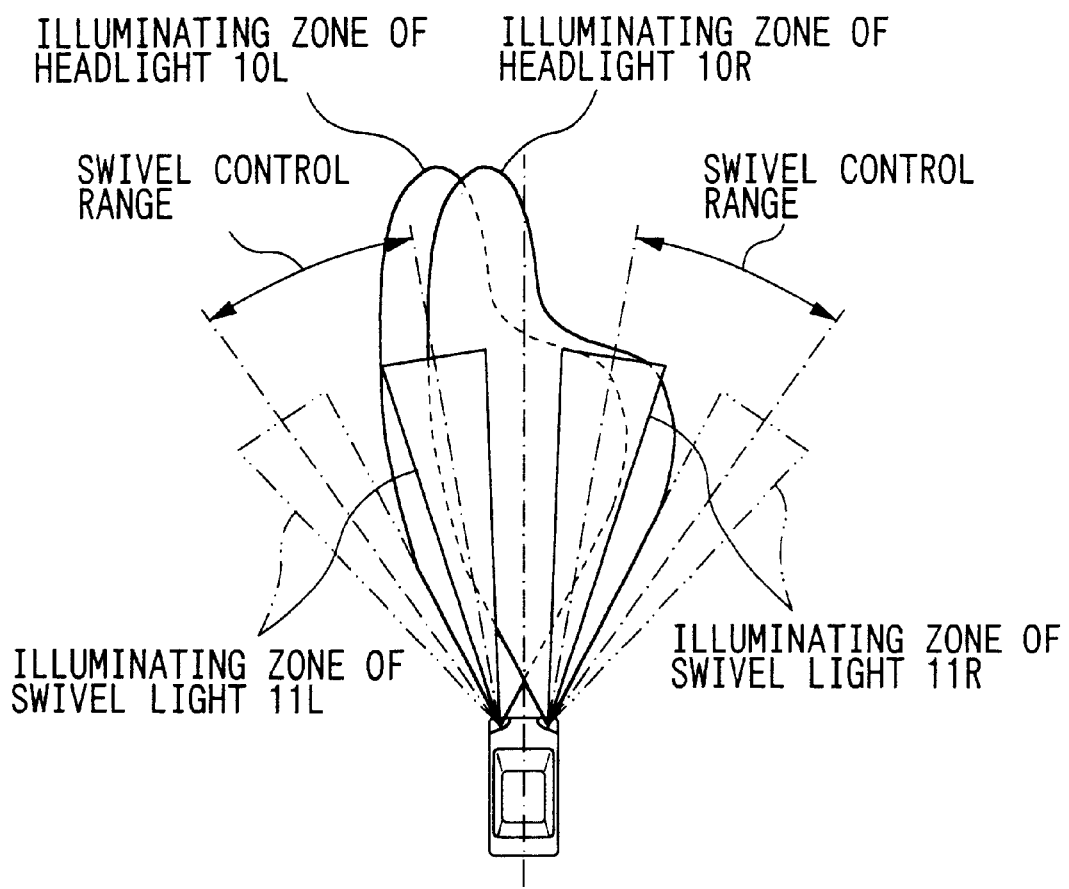
FIG. 2 is a schematic view showing illuminating zones of headlights and illuminating zones of swivel lights in the automatic optical-axis adjusting device according to the first and second embodiments of the present invention.

In the present embodiment, as shown in FIG. 2, an illuminating zone (measured during the low beam state) of a light beam (left beam) emitted from the headlight 10L and an illuminating zone (measured during the low beam state) of a light beam (right beam) emitted from the headlight 10R are substantially immovable in left and right directions. On the other hand, an illuminating zone of the swivel light 11L can be adjusted within its swivel control range in response to steering of the steering wheel 15 in the left or right direction from its neutral point, and an illuminating zone of the swivel light 11R can also be adjusted within its swivel control range in response to steering movement of the steering wheel 15 in the left or right direction from its neutral point.

Next, an optical-axis control operation carried out in the CPU 21 of the ECU 20 will be described with reference to FIGS. 3 to 5. An optical-axis control routine shown in FIG. 3 is repeated in the CPU 21 at predetermined time intervals.

Figure 3:
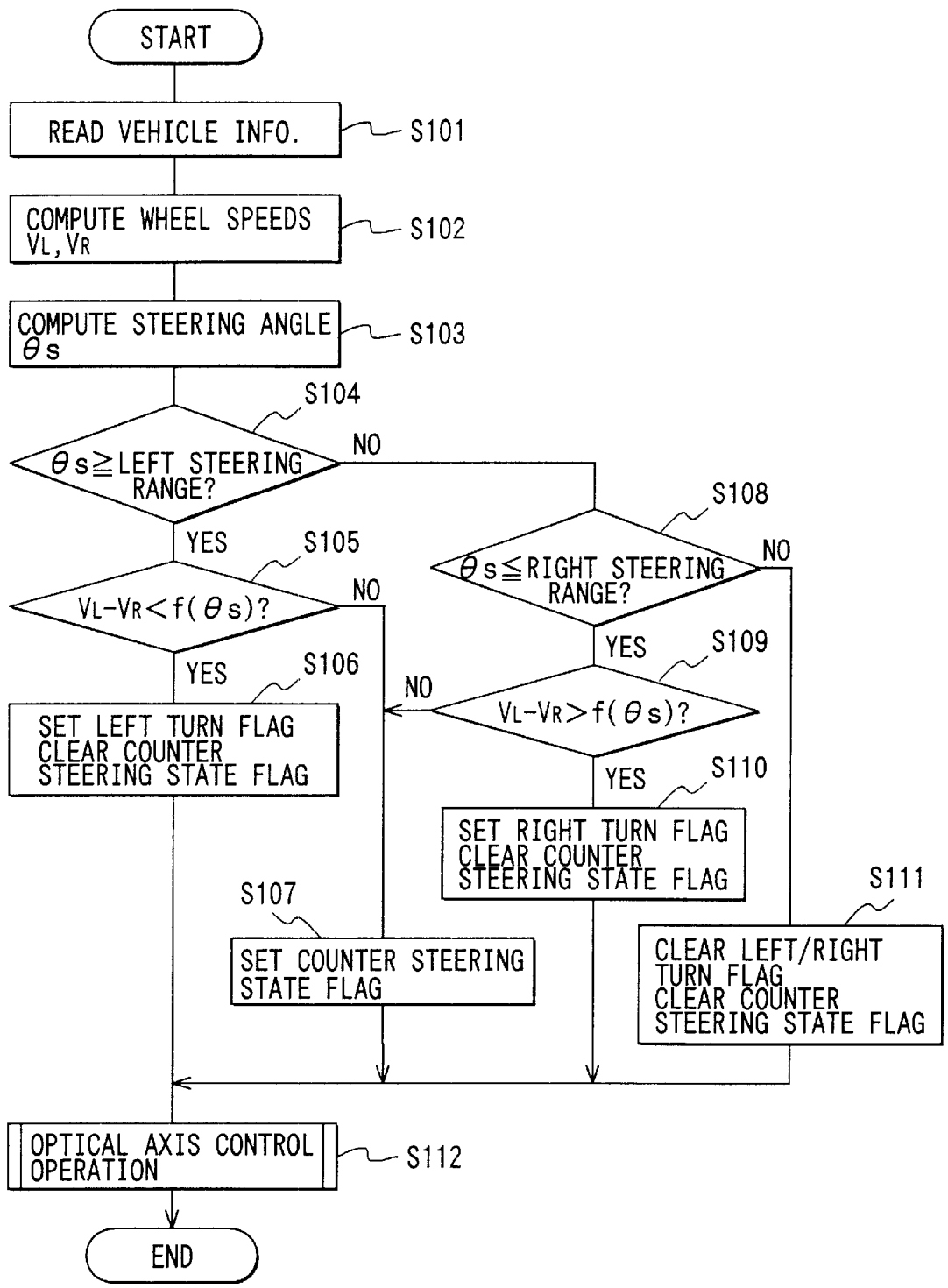
FIG. 3 is a flowchart showing an optical-axis control operation carried out in a CPU of an ECU arranged in the automatic optical-axis adjusting device according to the first embodiment of the present invention.

With reference to FIG. 3, at step S101, the output signal from the steering angle sensor 16, the output signal from the left wheel speed sensor 18L, the output signal from the right wheel speed sensor 18R and the various other sensor signals are read as vehicle information. Then, control moves to step S102 where a left wheel speed VL and a right wheel speed VR are computed based on the output signals from the left and right wheel speed sensors 18L, 18R, respectively. Next, control moves to step S103 where a steering angle θs of the steering wheel 15 is computed based on the output signal from the steering angle sensor 16.

Then, control moves to step S104 where it is determined whether the steering angle θs computed at step S103 is equal to or greater than a left steering range. If yes is returned at step S104, i.e., if the steering wheel 15 has been steered in the left direction beyond an insensible region arranged around the neutral point, control moves to step S105. At step S105, it is determined whether a value obtained by subtracting the right wheel speed VR from the left wheel speed VL is less than a function value f(θs) that is obtained based on the steering angle θs.

Figure 4:
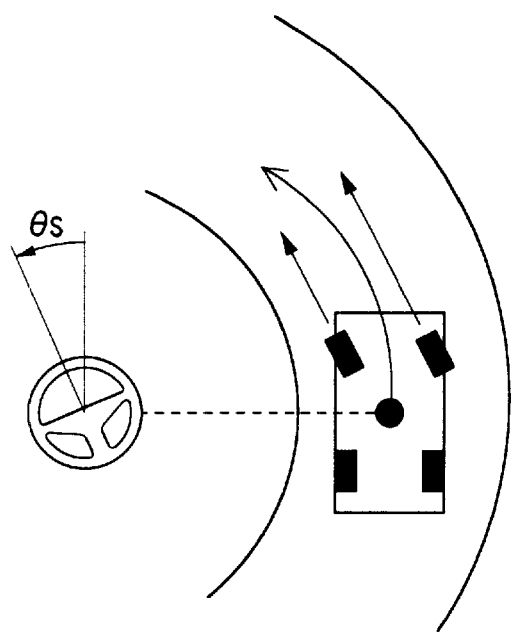
FIG. 4 is a schematic view showing a case where a turning direction of the vehicle coincides with a steering direction of a steering wheel in the operation of FIG. 3.
Figure 5:
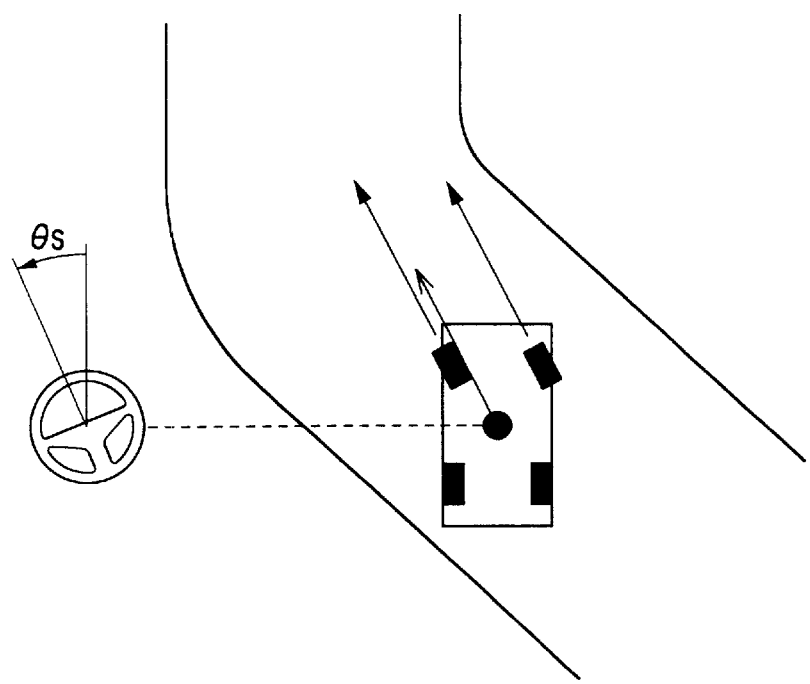
FIG. 5 is a schematic view showing a case where the turning direction of the vehicle is opposite to the steering direction of the steering wheel in the operation of FIG. 3.

If yes is returned at step S105, it is determined that the vehicle is turning leftward while the steering wheel 15 is steered in the left direction, as shown in FIG. 4, and control moves to step S106. At step S106, a left turn flag is set, and a counter steering state flag is cleared. On the other hand, if no is returned at step S105, it is determined that the vehicle is turning in the right direction while the steering wheel 15 is steered in the left direction, that is, the steering direction of the steering wheel 15 is opposite to the turning direction of the vehicle, as shown in FIG. 5, and control moves to step S107 where the counter steering state flag is set.

If no is returned at step S104, i.e., if the steering wheel 15 is not steered in the left direction, control moves to step S108. At step S108, it is determined whether the steering angle θs computed at step S103 is equal to or less than the right steering range. If yes is returned at step S108, i.e., if the steering wheel 15 has been steered in the right direction beyond the insensible region arranged around the neutral point, control moves to step S109. At step S109, it is determined whether a value obtained by subtracting the right wheel speed VR from the left wheel speed VL is greater than the function value f(θs) that is obtained based on the steering angle θs.

If yes is returned at step S109, it is determined that the vehicle is turning in the right direction while the steering wheel 15 is steered in the right direction, and control moves to step S110. At step S110, a right turn flag is set, and the counter steering state flag is cleared. On the other hand, if no is returned at step S109, it is determined that the vehicle is turning in the left direction while the steering wheel 15 is steered in the right direction, that is, the steering direction of the steering wheel 15 is opposite to the turning direction of the vehicle, and control moves to step S107. At step S107, the counter steering state flag is set.

If no is returned at step S108, i.e., if the steering angle θs computed at step S103 is not equal to or greater than the left steering range and is also not equal to or less than the right steering range, it is determined that the steering wheel 15 is in the insensible region located around the neutral point, and control moves to step S111. At step S111, the left or right turn flag and the counter steering state flag are all cleared. After completion of any one of steps S106, S107, S110 and S111, control moves to step S112. At step S112, the optical-axis control operation is carried out based on each flag state, and the present routine ends.

In the optical-axis control operation that is carried out when the left turn flag or the right turn flag is set, a swivel control of the left and right swivel lights 11L, 11R with respect to the turning direction of the vehicle is conducted based on the left turn flag or the right turn flag, so that the optical axes of the left and right swivel lights 11L, 11R are adjusted with respect to the turning direction of the vehicle. In the optical-axis control operation that is carried out when the counter steering state flag is set, the swivel control is stopped, and the current optical axes of the left and right swivel lights 11L, 11R are maintained, or alternatively the optical axes of the left and right swivel lights 11L, 11R are returned to its neutral position. In the optical-axis control operation that is carried out when the counter steering state flag is set, it is also possible to move the optical axes of the left and right swivel lights 11L, 11R in the direction opposite to the steering direction of the steering wheel 15 by modifying the above swivel control.

As described above, the automatic optical-axis adjusting device according to the present embodiment includes the steering angle sensor 16, the left and right wheel speed sensors 18L, 18R, and the ECU 20. The steering angle sensor 16 acts as a steering angle measuring means for measuring the steering angle θs of the steering wheel 15. The left and right wheel speed sensors 18L, 18R constitute a wheel speed measuring means for measuring the left and right wheel speeds VL, VR of the left and right wheels, respectively. The ECU 20 constitutes a swivel control means, a counter steering state determining means and a swivel modifying means. The swivel control means adjusts or substantially horizontally turns the optical axes of the left and right swivel lights (vehicle front lights) 11L, 11R in the left or right direction based on the steering angle θs measured with the steering angle sensor 16. The counter steering state determining means determines whether the steering wheel 15 is under the counter steering state, in which the steering direction of the steering wheel 15 is opposite to the turning direction of the vehicle. The steering wheel 15 is determined to be under the counter steering state when the following two conditions are both satisfied: (I) the steering angle θs measured with the steering angle sensor 16 is equal to or greater than a predetermined angle; and (II) the steering direction determined based on the steering angle θs does not coincide with the turning direction of the vehicle that is estimated based on the difference between the left wheel speed VL and the right wheel speed VR measured with the left and right wheel speed sensors 18L, 18R. The swivel modifying means stops or modifies the adjustment of the optical axes of the left and right swivel lights 11L, 11R through the swivel control means when the counter steering state determining means determines that the steering wheel 15 is under the counter steering state.

That is, if the steering wheel 15 is steered such that the steering angle θs measured with the steering angle sensor 16 is equal to or greater than a predetermined value, and the steering direction determined based on the steering angle θs does not coincide with the turning direction of the vehicle that is estimated based on the difference between the left wheel speed VL and the right wheel speed VR measured with the left and right wheel speed sensors 18L, 18R, it is determined that the steering wheel 15 is under the counter steering state, and the optical-axis adjustment of the left and right swivel lights 11L, 11R is stopped or modified. Thus, the optical axes of the left and right swivel lights 11L, 11R are prevented from turning in a direction that is different from a desired sight direction of a vehicle driver, so that the left and right swivel lights 11L, 11R do not cause an uncomfortable feeling to the driver. In this optical-axis control, there is no need to use any other signals, such as a lateral G signal, a yaw rate signal and the like. Thus, only the three signals, namely, the signal indicative of the steering angle θs outputted from the steering angle sensor 16, the signal indicative of the left wheel speed VL outputted from the left wheel speed sensor 18L and the signal indicative of the right wheel speed VR outputted from the right wheel speed sensor 18R are used in the optical-axis control of the present embodiment, and it is possible to appropriately deal with the counter steering state of the steering wheel 15.

(Second Embodiment)

Figure 6:
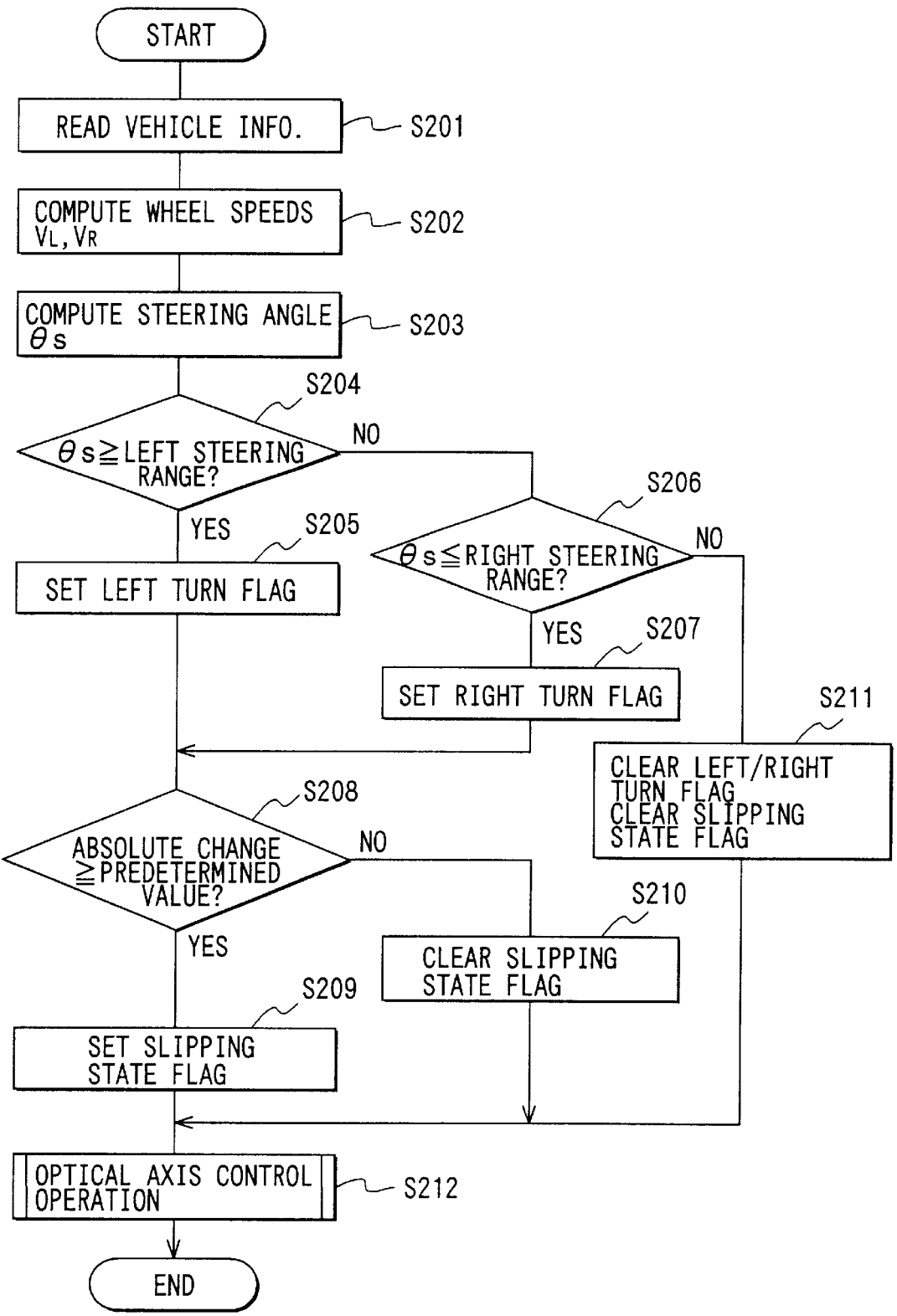
FIG. 6 is a flowchart showing an optical-axis control operation carried out in the CPU of the ECU arranged in an automatic optical-axis adjusting device according to a second embodiment of the present invention.

FIG. 6 is a flowchart showing an optical-axis control operation carried out in the CPU 21 of the ECU 20 arranged in an automatic optical-axis adjusting device according to a second embodiment of the present invention. This optical-axis control routine is repeated in the CPU 21 at predetermined time intervals. A structure and illuminating zones of the automatic optical-axis adjusting device for automatically adjusting the optical axes of the vehicle front lights according to the second embodiment of the present invention are similar to those of the first embodiment described with reference to FIGS. 1 and 2, so that only the differences between them will be described below.

With reference to FIG. 6, steps S201–S204 are substantially the same as steps S101–S104 of the first embodiment shown FIG. 3, so that steps S201–S204 will not be described further below. If yes is returned at step S204, i.e., if the steering wheel 15 is steered in the left direction beyond the insensible region arranged around the neutral point, control moves to step S205. At step S205, the left turn flag is set.

On the other hand, if no is returned at step S204, i.e., if the steering wheel 15 is not steered in the left direction, control moves to step S206. At step S206, it is determined whether the steering angle θs computed at step S203 is equal to or less than the right steering range. If yes is returned at step S206, i.e., if the steering wheel 15 is steered in the right direction beyond the insensible region arranged around the neutral point, control moves to step S207. At step S207, the right turn flag is set.

After completion of any one of steps S205 and S207, control moves to step S208. At step S208, it is determined whether an absolute value of a change per unit time (absolute change) of the difference between the left wheel speed and the right wheel speed is equal to or greater than a predetermined value. Here, for example, the change per unit time of the difference between the left wheel speed and the right wheel speed can be a difference between a previously measured difference between the left wheel speed and the right wheel speed and a currently measured difference between the left wheel speed and the right wheel speed. For example, if the vehicle starts slipping on a wet curve road, the measured difference between the left wheel speed and the right wheel speed rapidly changes. This operation is based on this fact. If yes is returned at step S208, it is determined that the absolute value of the change per unit time of the difference between the left wheel speed and the right wheel speed is greater than a predicted range, that is, the vehicle is slipping on the road, and control moves to step S209. At step S209, a slipping state flag is set.

On the other hand, if the absolute value of the change per unit time of the difference between the left wheel speed and the right wheel speed is less than the predetermined value, the absolute value of the change per unit time of the difference between the left wheel speed and the right wheel speed is within the predicted range, that is, the vehicle is not slipping on the road, and control moves to step S210. At step S210, the slipping state flag is cleared.

If no is returned at step S206, i.e., if the steering angle θs computed at step S203 is not equal to or greater than the left steering range and is also not equal to or less than the right steering range, it is determined that the steering wheel 15 is in the insensible region located around the neutral point, and control moves to step S211. At step S211, the left or right turn flag and the slipping state flag are all cleared. After completion of any one of steps S209–S211, control moves to step S212. At step S212, the optical-axis control operation is carried out based on each flag state, and the present routine ends.

In the optical-axis control operation that is carried out when the left turn flag or the right turn flag is set, a swivel control of the left and right swivel lights 11L, 11R with respect the turning direction of the vehicle is conducted based on the left turn flag or the right turn flag, so that the optical axes of the left and right swivel lights 11L, 11R are adjusted with respect to the turning direction of the vehicle. In the optical-axis control operation that is carried out when the slipping state flag is set, the swivel control is stopped, and the current optical axes of the left and right swivel lights 11L, 11R are maintained, or alternatively the optical axes of the left and right swivel lights 11L, 11R are returned to its neutral position.

As described above, the automatic optical-axis adjusting device according to the present embodiment includes the steering angle sensor 16, the left and right wheel speed sensors 18L, 18R, and the ECU 20. The steering angle sensor 16 acts as a steering angle measuring means that measures the steering angle θs of the steering wheel 15. The left and right wheel speed sensors 18L, 18R constitute a wheel speed measuring means for measuring the left and right wheel speeds VL, VR of the left and right vehicle wheels, respectively. The ECU 20 constitutes a swivel control means, a slipping state determining means and a swivel modifying means. The swivel control means adjusts or substantially horizontally turns the optical axes of the left and right swivel lights (vehicle front lights) 11L, 11R in the left or right direction based on the steering angle θs measured with the steering angle sensor 16. The slipping state determining means determines whether the vehicle is under the slipping state. The vehicle is determined to be under the slipping state when the following two conditions are both satisfied: (I) the steering angle θs measured with the steering angle sensor 16 is equal to or greater than a predetermined angle; and (II) the absolute value of the change per unit time of the difference between the left wheel speed VL and the right wheel speed VR is equal to or greater than the predetermined value. The swivel modifying means stops or modifies the adjustment of the optical axes of the left and right swivel lights 11L, 11R through the swivel control means when the slipping state determining means determines that the vehicle is under the slipping state.

That is, if the steering wheel 15 is steered such that the steering angle θs measured with the steering angle sensor 16 is equal to or greater than the predetermined value, and the absolute value of the change per unit time of the difference between the left wheel speed VL and the right wheel speed VR is equal to or greater than the predetermined value, it is determined that the vehicle is under the slipping state, and the optical axes adjustment of the left and right swivel lights 11L, 11R is stopped or modified. Thus, the optical axes of the left and right swivel lights 11L, 11R are prevented from turning to a direction that is different from a desired sight direction of a vehicle driver, so that the left and right swivel lights 11L, 11R do not cause an uncomfortable feeling to the driver. In this optical-axis control, there is no need to use any other signals, such as a lateral G signal, a yaw rate signal and the like. Thus, only three signals, namely, the signal indicative of the steering angle θs outputted from the steering angle sensor 16, the signal indicative of the left wheel speed VL outputted from the left wheel speed sensor 18L and the signal indicative of the right wheel speed VR outputted from the right wheel speed sensor 18R are used in the optical-axis control, and it is possible to appropriately deal with the slipping state of the vehicle.

The above embodiments can be modified as follows.

In the above embodiments, the swivel control is carried out for the left and right swivel lights 11L, 11R that are arranged separately from the left and right head lights 10L, 10R. In practice, however, the present invention is not limited to this, and the left and right headlights 10L, 10R can be directly controlled in a manner similar to that described with reference to the swivel lights 11L, 11R.

Furthermore, the slipping state determining means of the second embodiment can be incorporated in the automatic optical-axis adjusting device of the first embodiment, and the swivel modifying means of the first embodiment can be modified such that the swivel modifying means is also used for stopping or modifying the adjustment of the optical axes of the swivel lights 11L, 11R through the swivel control means when the slipping state determining means determines that the vehicle is under the slipping state.

Additional advantages and modifications will readily occur to those skilled in the art. The invention in its broader terms is therefore, not limited to the specific details, representative apparatus, and illustrative examples shown and described.

What is claimed is:

1. An automatic optical-axis adjusting device for automatically adjusting an optical axis of at least one front light of a vehicle, said automatic optical-axis adjusting device comprising:

a steering angle measuring means for measuring a steering angle of a steering wheel of said vehicle;

a wheel speed measuring means for measuring left and right wheel speeds of left and right wheels of said vehicle, respectively;

a swivel control means for adjusting said optical axis of said at least one front light by turning said optical axis of said at least one front light in a right or left direction based on said steering angle measured with said steering angle measuring means;

a counter steering state determining means for determining whether said steering wheel is under a counter steering state, said steering wheel being determined to be under said counter steering state when:

a steering direction of said steering wheel determined based on said steering angle does not coincide with a turning direction of said vehicle estimated based on a difference between said left wheel speed and said right wheel speed measured with said wheel speed measuring means; and a swivel modifying means for stopping or modifying adjustment of said optical axis of said at least one front light through said swivel control means when said counter steering state determining means determines that said steering wheel is under said counter steering state.

2. An automatic optical-axis adjusting device according to claim 1, further comprising a slipping state determining means for determining whether said vehicle is under a slipping state, said vehicle being determined to be under said slipping state when:

an absolute value of a change per unit time of said difference between said left wheel speed and said right wheel speed measured with said wheel speed measuring means is equal to or greater than a predetermined value, wherein said swivel modifying means is also used for stopping or modifying said adjustment of said optical axis of said at least one front light through said swivel control means when said slipping state determining means determines that said vehicle is under said slipping state.

3. An automatic optical-axis adjusting device according to claim 1, wherein said counter steering state determining means determines whether said steering wheel is under said counter steering state when said steering angle measured with said steering angle measuring means indicates that said steering wheel is steered from a neutral point of said steering wheel by an amount equal to or greater than a predetermined amount.

4. An automatic optical-axis adjusting device according to claim 1, wherein:

said counter steering state determining means determines whether said steering direction of said steering wheel does not coincide with said turning direction of said vehicle by comparing said difference between said left wheel speed and said right wheel speed measured with said wheel speed measuring means, with a corresponding function value that is a function of said steering angle of said steering wheel.

5. An automatic optical-axis adjusting device according to claim 4, wherein said function value indicates a theoretical difference between a left wheel speed of said left wheel and a right wheel speed of said right wheel at said steering angle of said steering wheel measured with said steering angle measuring means.

6. An automatic optical-axis adjusting device for automatically adjusting an optical axis of at least one front light of a vehicle, said automatic optical-axis adjusting device comprising:

a steering angle measuring means for measuring a steering angle of a steering wheel of said vehicle;

a wheel speed measuring means for measuring left and right wheel speeds of left and right wheels of said vehicle, respectively;

a swivel control means for adjusting said optical axis of said at least one front light by turning said optical axis of said at least one front light in a right or left direction based on said steering angle measured with said steering angle measuring means;

a slipping state determining means for determining whether said vehicle is under a slipping state, said vehicle being determined to be under said slipping state when:

an absolute value of a change per unit time of a difference between said left wheel speed and said right wheel speed measured with said wheel speed measuring means is equal to or greater than a predetermined value; and a swivel modifying means for stopping or modifying adjustment of said optical axis of said at least one front light through said swivel control means when said slipping state determining means determines that said vehicle is under said slipping state.

7. An automatic optical-axis adjusting device according to claim 6, wherein said slipping state determining means determines whether said vehicle is under said slipping state when said steering angle measured with said steering angle measuring means indicates that said steering wheel is steered from a neutral point of said steering wheel by an amount equal to or greater than a predetermined amount.

* * * * *